United States Patent Office.

LUDWIG OTTO HELMERS, OF HAMBURG, GERMANY, ASSIGNOR TO ICHTHYOL GESELLSCHAFT, CORDES, HERMANNI & CO., OF SAME PLACE.

TASTELESS COMPOUND FROM SULFURETED HYDROCARBONS AND PROCESS OF MAKING SAME.

SPECIFICATION forming part of Letters Patent No. 624,028, dated May 2, 1899.

Original application filed February 23, 1898, Serial No. 671,369. Divided and this application filed August 16, 1898. Serial No. 688,709. (Specimens.)

*To all whom it may concern:*

Be it known that I, LUDWIG OTTO HELMERS, doctor of philosophy, a subject of the German Emperor, residing at Hamburg, in the German Empire, have invented certain new and useful Improvements in the Production of Sulfonic-Acid Salts of Alkaline-Earthy Metals and Metals Proper, (forming divisional portion of my pending application filed February 23, 1898, Serial No. 671,369,) of which the following is a specification.

The ammonium, sodium, and lithium compounds of the product obtained by the action of sulfuric acid upon Seefeld mineral oil and known under the name of "ichthyol," heretofore employed in therapeutics, represent substances soluble in water and having a very intense and peculiar taste. If the sulfonic acid of the ichthyol serving as the initial product of these compounds be neutralized with lime, (calcium carbonate,) magnesia, (magnesium carbonate,) or a metallic oxid, (its carbonic salt,) instead of employing ammonia, soda, or lithium carbonate, then the corresponding ichthyol compounds of the alkaline earths or of the metals, respectively, are obtained. These compounds are entirely insoluble in water and therefore may also be obtained by alternate decomposition of solutions of ichthyol-alkalies with soluble salts of the alkaline earths or of the metals. After drying at a temperature of 100° centigrade these ichthyol-salts admit of being pulverized and then form a brown-black non-hygroscopic powder, which is insoluble in water, as well as in solutions of organic acids. On the other hand, it readily dissolves in chloroform. When heated with mineral acids, the base again splits off and ichthyol sulfonic acid is reformed. Also by heating with caustic alkalies or carbonic alkalies the salts become decomposed. The ichthyol-alkaline salt which is dissolved and the oxid or carbonate, respectively, of the base of the ichthyol-salt employed are formed. In spite of their being insoluble in water, these ichthyol compounds yet possess rather a strong taste, even after having been most carefully washed with water. Experiments have shown that the taste is due to the existence of peculiar substances, of which a small quantity remains mixed with the salts, properly speaking. As described in the specification of my pending application, (Serial No. 671,369,) it is possible to obtain tasteless products by extracting the salts with certain solvents, by which process the substances causing a peculiar taste are removed. Upon further examining the substances extracted by a solvent, such as alcohol, it was found that when heated up to a temperature of about 130° to 140° centigrade these substances undergo a decomposition, while tasteless products are formed. The alcoholic extract originally presenting a light-brown color, in this chemical action turns perceptibly darker and melts down to a hard and brittle mass under disengagement of vapors. In consequence of these facts attempts were made to destroy those substances mixed with the ichthyol-salts, even with the soluble ichthyol-salts, and causing the peculiar taste without using extracting agents by simply heating the products in order to obtain tasteless salts. In the case of the salts soluble in water—namely, the ichthyol-sodium, ichthyol-ammonium, ichthyol-lithium—the experiment did not prove the supposition to be correct. The substances heated for ten hours to a temperature of about 130° to 140° centigrade still possessed a distinct taste. This taste therefore is peculiar to the alkali salts. Moreover, these salts, and especially the ichthyol-ammonium, when being heated, suffer decomposition in a considerable measure, which becomes already apparent by the incomplete solubility of the heated product in water.

The ichthyol-salts of the earthy alkalies and metals behave differently from the alkaline salts. On exposing these products for about six hours up to a temperature of about 130° to 140° centigrade they lose their taste entirely, while otherwise remaining unchanged. Thus, for example, the heated products are split up just as completely, though with somewhat more difficulty, by mineral acids and alkalies. Like the ichthyol-salts also behave the corresponding salts of sulfonic-acid compounds derived from sulfureted hydrocarbons combined with sulfuric acid.

The following examples may serve for illustrating the process:

(a) One kilogram of ichthyol sulfonic acid, which by repeated solution in water and precipitation by means of hydrochloric acid, is freed from the sulfuric acid adherent thereto, is dissolved in five kilograms of water and neutralized by means of ammonia. The solution is subsequently mixed with about one and a half liters of a calcium-chlorid solution of twenty per cent., the precipitated ichthyol calcium is washed with water as long as hydrochloric acid is present in the water, and the admixed water finally is evaporated at the lowest possible temperature. The dry residue, which amounts to about one-half kilogram, lastly is for five to eight hours exposed to a temperature up to about 130° to 140° centigrade, at the end of which operation it has lost three to four per cent. of its weight.

(b) One kilogram of ichthyol-ammonium dissolved in twelve liters of water is, while stirring the product, mixed with one-half kilogram of ferric sulfate dissolved in fifteen liters of water and having a little acetic acid added to it. The liquid becomes clear after the lapse of a few hours and is then decanted from the precipitate, which consists of ichthyol-iron, by washing the ichthyol-iron with water. It is freed from the iron solution adherent in excess. It is subsequently dried at a temperature of 100°. Finally the temperature is raised to about 120° centigrade for several hours.

Having now particularly described and ascertained the nature of my said invention and in what manner the same is to be performed, I declare that what I claim is—

1. The process of rendering tasteless sulfonic-acid salts of alkaline-earthy metals and metals proper from sulfureted hydrocarbons combined with sulfuric acid which consists in heating the salts up to about 130° to 140° centigrade, substantially as set forth.

2. As a new product of manufacture the herein-described sulfonic-acid salts of alkaline-earthy metals and metals proper derived from sulfureted hydrocarbons combined with sulfuric acid, which salts in a pulverulent state are insoluble in water, and devoid of taste and smell.

In testimony that I claim the foregoing as my invention I have signed my name, in presence of two witnesses, this 3d day of August, 1898.

LUDWIG OTTO HELMERS.

Witnesses:
GEORG HARBORT,
ALEXANDER SPECHT.